United States Patent
Kamiyama et al.

(10) Patent No.: US 11,756,554 B2
(45) Date of Patent: *Sep. 12, 2023

(54) ATTRIBUTE IDENTIFICATION METHOD, AND PROGRAM

(71) Applicant: Nippon Telegraph and Telephone Corporation, Chiyoda-ku (JP)

(72) Inventors: Hosana Kamiyama, Yokosuka (JP); Satoshi Kobashikawa, Yokosuka (JP); Atsushi Ando, Yokosuka (JP)

(73) Assignee: Nippon Telegraph and Telephone Corporation, Chiyoda-ku (JP)

( * ) Notice: Subject to any disclaimer, the term of this patent is extended or adjusted under 35 U.S.C. 154(b) by 186 days.

This patent is subject to a terminal disclaimer.

(21) Appl. No.: 17/408,597

(22) Filed: Aug. 23, 2021

(65) Prior Publication Data
US 2021/0383812 A1 Dec. 9, 2021

Related U.S. Application Data (63) Continuation of application No. 16/606,986, filed as application No. PCT/JP2018/018388 on May 11, 2018, now Pat. No. 11,133,012.

(30) Foreign Application Priority Data

May 25, 2017 (JP) .................................. 2017-103384

(51) Int. Cl.
*G10L 17/04* (2013.01)
*G06F 17/18* (2006.01)
(Continued)

(52) U.S. Cl.
CPC .............. *G10L 17/04* (2013.01); *G06F 17/18* (2013.01); *G10L 15/08* (2013.01); *G06N 20/00* (2019.01)

(58) Field of Classification Search
CPC .......... G10L 17/04; G10L 15/08; G06F 17/18; G06N 20/00
See application file for complete search history.

(56) References Cited

U.S. PATENT DOCUMENTS

2014/0330566 A1* 11/2014 Redfern .............. G10L 15/1822
704/246
2015/0269940 A1* 9/2015 Fujimura ................ G10L 17/26
704/246

FOREIGN PATENT DOCUMENTS

| JP | 2005-140988 A | 6/2005 |
| JP | 2005140988 A * | 6/2005 |

(Continued)

OTHER PUBLICATIONS

Miyamori, S. et al., "An investigation of child user identification based on speech recognition of a short sentence," FIT (The Institute of Electronics, Information and Communication Engineers and Information Processing Society of Japan) Steering Committee, Proceedings of Forum on Information Technology 9(3), 2010, pp. 469-472, with partial translation.

(Continued)

*Primary Examiner* — Anne L Thomas-Homescu
(74) *Attorney, Agent, or Firm* — Oblon, McClelland, Maier & Neustadt, L.L.P.

(57) ABSTRACT

An attribute identification technology that can reject an attribute identification result if the reliability thereof is low is provided. An attribute identification device includes: a posteriori probability calculation unit 110 that calculates, from input speech, a posteriori probability sequence $\{q(c, i)\}$ which is a sequence of the posteriori probabilities $q(c, i)$ that a frame i of the input speech is a class c; a reliability calculation unit 120 that calculates, from the posteriori probability sequence $\{q(c, i)\}$, reliability $r(c)$ indicating the extent to which the class c is a correct attribute identification (Continued)

result; and an attribute identification result generating unit 130 that generates an attribute identification result L of the input speech from the posteriori probability sequence $\{q(c, i)\}$ and the reliability $r(c)$. The attribute identification result generating unit 130 obtains a most probable estimated class $\hat{c}$, which is a class that is estimated to be the most probable attribute, from the posteriori probability sequence $\{q(c, i)\}$ and sets φ indicating rejection as the attribute identification result L if the reliability $r(\hat{c})$ of the most probable estimated class $\hat{c}$ falls within a predetermined range indicating that the reliability $r(\hat{c})$ is low and sets the most probable estimated class $\hat{c}$ as the attribute identification result L otherwise.

4 Claims, 8 Drawing Sheets

(51) Int. Cl.
  *G10L 15/08* (2006.01)
  *G06N 20/00* (2019.01)

(56) References Cited

FOREIGN PATENT DOCUMENTS

| | | | | |
|---|---|---|---|---|
| JP | 2006-121611 A | | 5/2006 | |
| JP | 2006121611 A | * | 5/2006 | |
| JP | 2006-208483 A | | 8/2006 | |
| JP | 2006208483 A | * | 8/2006 | |
| JP | 2011-175587 A | | 9/2011 | |
| JP | 2011175587 A | * | 9/2011 | |
| JP | 2015-184378 A | | 10/2015 | |
| JP | 2015184378 A | * | 10/2015 | ............. G10L 17/26 |

OTHER PUBLICATIONS

Nakamura, S. "Towards Robust Speech Recognition in Real Acoustic Environments", The Institute of Electronics, Information and Communication Engineers, Technical report of IEICE, EA2002-12, SP2002-12, 2002, pp. 31-36.
International Search Report dated Jul. 24, 2018 in PCT/JP2018/018388 filed on May 11, 2018.

* cited by examiner

(A) IN THE PRESENCE OF SPEECH ALONE

FIG. 3A (B) IN THE PRESENCE OF SPEECH ON WHICH TELEVISION NOISE IS SUPERIMPOSED

(A) WHEN NOISE WAS NOT SUPERIMPOSED ($r_k = 1$)

FIG. 10A (B) WHEN NOISE WAS SUPERIMPOSED AND JUDGMENT WAS CORRECT ($r_k = 1$)

FIG. 10B (C) WHEN NOISE WAS SUPERIMPOSED AND JUDGMENT WAS INCORRECT ($r_k = 0$)

FIG. 10C

ATTRIBUTE IDENTIFICATION METHOD, AND PROGRAM

CROSS-REFERENCE TO RELATED APPLICATIONS

This application is a continuation of and claims the benefit of priority under 35 U.S.C. § 120 from U.S. application Ser. No. 16/606,986 filed Oct. 21, 2019, the entire contents of which are incorporated herein by reference. U.S. application Ser. No. 16/606,986 is a National Stage of PCT/JP2018/018388 filed May 11, 2018, which claims the benefit of priority under 35 U.S.C. § 119 from Japanese Application No. 2017-103384 filed May 25, 2017.

TECHNICAL FIELD

The present invention relates to a technology for identifying an attribute of a speaker based on uttered speech.

BACKGROUND ART

A technology for identifying an attribute (for example, gender or an age bracket) based on speech is needed for the purpose of gathering marketing information by a voice interactive robot or in a call center. As the existing technology for attribute identification, there are a method for identifying an attribute by using a Gaussian mixture model (GMM) (Non-patent Literature 1), a method for identifying an attribute by i-vectors extracted from speech by using a support vector machine (SVM), and the like.

With these existing technologies, an attribute is sometimes erroneously identified due to the influence of ambient noise. In particular, when a radio broadcast, a television broadcast, or the like including speech or music is superimposed on uttered speech as noise (hereinafter also referred to as television noise), a plurality of types of speech are present. In this case, it is difficult to differentiate between the uttered speech and the speech included in the television noise, which results in erroneous identification of an attribute.

For this reason, a method for implementing robust attribute identification by performing machine learning on speech on which noise is superimposed in advance is also proposed (Non-patent Literature 2).

PRIOR ART LITERATURE

Non-Patent Literature

Non-patent Literature 1: Shoko Miyamori, Ryuichi Nishimura, Risa Kurihara, Toshio Irino, Hideki Kawahara, "An investigation of child user identification based on speech recognition of a short sentence", FIT (The Institute of Electronics, Information and Communication Engineers and Information Processing Society of Japan) Steering Committee, Proceedings of Forum on Information Technology 9(3), pp. 469-472, 2010.

Non-patent Literature 2: Satoshi Nakamura, "Towards Robust Speech Recognition in Real Acoustic Environments", The Institute of Electronics, Information and Communication Engineers, Technical report of IEICE, EA2002-12, SP2002-12, pp. 31-36, 2002.

SUMMARY OF THE INVENTION

Problems to be Solved by the Invention

However, since the variety of noise conditions that occur due to the influence of speech or music included in television noise is quite wide, it is impossible to perform exhaustive learning so as to achieve a robust operation under any noise conditions. Moreover, if learning is performed by using learned data limited to some noise conditions, speech included in noise is learned as a feature for attribute identification, which can actually cause an error in identification which is performed under low-noise conditions. Therefore, in view of the degree of satisfaction of the user (hereinafter referred to as usability), it is better to reject the erroneous identification result than to provide the result; however, giving an attribute identification result in a uniform manner causes a problem of impaired usability.

An object of the present invention is accordingly to provide an attribute identification technology that can reject an attribute identification result if the reliability of the attribute identification result is low.

Means to Solve the Problems

An aspect of the present invention is an attribute identification device, in which, if I is assumed to be an integer greater than or equal to 0 and a set of classes for identifying a speaker of uttered speech is assumed to be an attribute, the attribute identification device includes: a posteriori probability calculation unit that calculates, from input speech s(t), a posteriori probability sequence $\{q(c, i)\}$ (i=0, 1, ..., I) which is a sequence of the posteriori probabilities q(c, i) that a frame i of the input speech s(t) is a class c; a reliability calculation unit that calculates, from the posteriori probability sequence $\{q(c, i)\}$ (i=0, 1, ..., I), reliability r(c) indicating the extent to which the class c is a correct attribute identification result; and an attribute identification result generating unit that generates an attribute identification result L of the input speech s(t) from the posteriori probability sequence $\{q(c, i)\}$ (i=0, 1, ..., I) and the reliability r(c). The attribute identification result generating unit obtains a most probable estimated class c^, which is a class that is estimated to be the most probable attribute, from the posteriori probability sequence $\{q(c, i)\}$ (i=0, 1, ..., I) and sets φ indicating rejection as the attribute identification result L if the reliability r(c^) of the most probable estimated class c^ falls within a predetermined range indicating that the reliability r(c^) is low and sets the most probable estimated class c^ as the attribute identification result L otherwise.

An aspect of the present invention is an attribute identification device, in which, if I is assumed to be an integer greater than or equal to 0 and a set of classes for identifying a speaker of uttered speech is assumed to be an attribute, the attribute identification device includes: a posteriori probability calculation unit that calculates, from input speech s(t), a posteriori probability sequence $\{q(c, i)\}$ (i=0, 1, ..., I) which is a sequence of the posteriori probabilities q(c, i) that a frame i of the input speech s(t) is a class c; a reliability calculation unit that calculates, from the posteriori probability sequence $\{q(c, i)\}$ (i=0, 1, ..., I), reliability r(c) indicating the extent to which the class c is a correct attribute identification result; and an attribute identification result generating unit that generates an attribute identification result L of the input speech s(t) from the reliability r(c). The attribute identification result generating unit obtains a most probable estimated class c^, which is a class that is estimated to be the most probable attribute, from the reliability r(c) and sets φ indicating rejection as the attribute identification result L if the reliability r(c^) of the most probable estimated class c^ falls within a predetermined range indicating that the reliability r(c^) is low and sets the most probable estimated class c^ as the attribute identification result L otherwise.

An aspect of the present invention is an attribute identification device, in which, if I is assumed to be an integer greater than or equal to 0 and a set of classes for identifying a speaker of uttered speech is assumed to be an attribute, the attribute identification device includes: a posteriori probability calculation unit that calculates, from input speech s(t), a posteriori probability sequence {q(c, i)} (i=0, 1, ..., I) which is a sequence of the posteriori probabilities q(c, i) that a frame i of the input speech s(t) is a class c; and an attribute identification result generating unit that generates an attribute identification result L of the input speech s(t) from the posteriori probability sequence {q(c, i)} (i=0, 1, ..., I). The attribute identification result generating unit includes a reliability calculation unit that calculates, from the posteriori probability sequence {q(c, i)} (i=0, 1, ..., I), reliability r(c) indicating the extent to which the class c is a correct attribute identification result, and obtains a most probable estimated class ĉ, which is a class that is estimated to be the most probable attribute, from the posteriori probability sequence {q(c, i)} (i=0, 1, ..., I), calculates the reliability r(ĉ) of the most probable estimated class ĉ by using the reliability calculation unit, and sets φ indicating rejection as the attribute identification result L if the reliability r(ĉ) falls within a predetermined range indicating that the reliability r(ĉ) is low and sets the most probable estimated class ĉ as the attribute identification result L otherwise.

Effects of the Invention

According to the present invention, it is possible to prevent impairment of usability by rejecting an attribute identification result if the reliability thereof, which indicates the certainty of the attribute identification result, is low.

DETAILED DESCRIPTION OF THE EMBODIMENTS

Hereinafter, embodiments of the present invention will be described in detail. It is to be noted that component units having the same function will be identified with the same reference numeral and overlapping explanations will be omitted.

Definition

Hereinafter, terms which are used in the embodiments will be described.

Speech s(t) is an amplitude in a sampling time t (t= 0, 1, ..., $T_k$-1, where $T_k$ is an integer greater than or equal to 1) when the sampling frequency is assumed to be fs [Hz]. Moreover, a feature amount x(i) is a feature amount which is extracted from a frame i (i=0, 1, ..., I, where I is an integer greater than or equal to 0 and I+1 represents the number of frames generated from the speech s(t)) of the speech s(t). For example, assume that the mel-frequency cepstral coefficient (MFCC) or fundamental frequency is used as a feature amount; then, the feature amount can be extracted by setting appropriate analysis frame width and frame shift (for instance, by setting the analysis frame width to 50 ms and the frame shift to ms).

An attribute is a set of classes (attribute values) for identifying a speaker of uttered speech. For example, for an attribute "gender", "male" and "female" are provided as classes. For an attribute "age bracket", "teens", "twenties", "thirties", and the like are provided as classes. Moreover, an attribute obtained by combining gender and an age bracket may be used; in this case, for example, "adult male", "adult female", "child", and the like can be used as classes. In general, a class (an attribute value) is expressed as c (c=0, 1, ..., C, where C is an integer greater than or equal to 0 and C+1 represents the number of classes). For instance, an attribute value c in gender identification only has to represent "male" when c=0 and "female" when c=1. Furthermore, an attribute identification model $\lambda_c$ is a model that outputs, by using the feature amount x(i) of a frame i as input, the posteriori probability p(c|x(i)) (c=0, 1, ..., C) that a class is c when the feature amount is x(i). The attribute identification model $\lambda_c$ can be implemented by using, for example, a neural network such as a deep neural network (DNN).

First Embodiment

Figure 1:
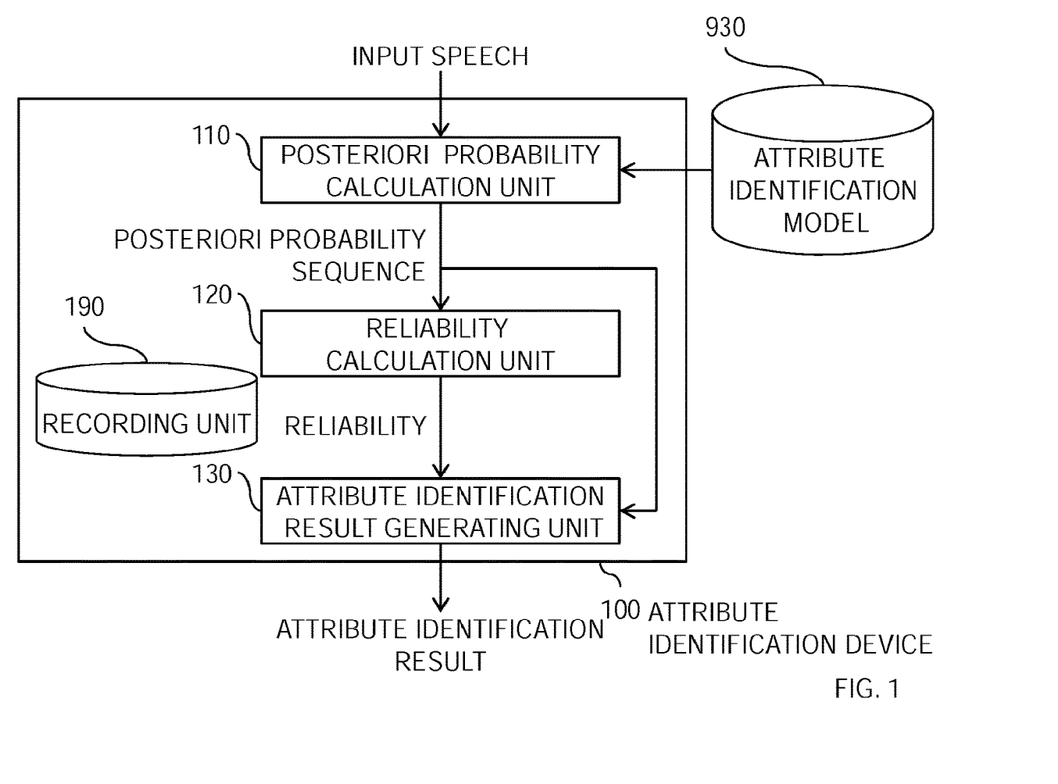
FIG. 1 is a block diagram illustrating an example of the configuration of an attribute identification device 100.
Figure 2:
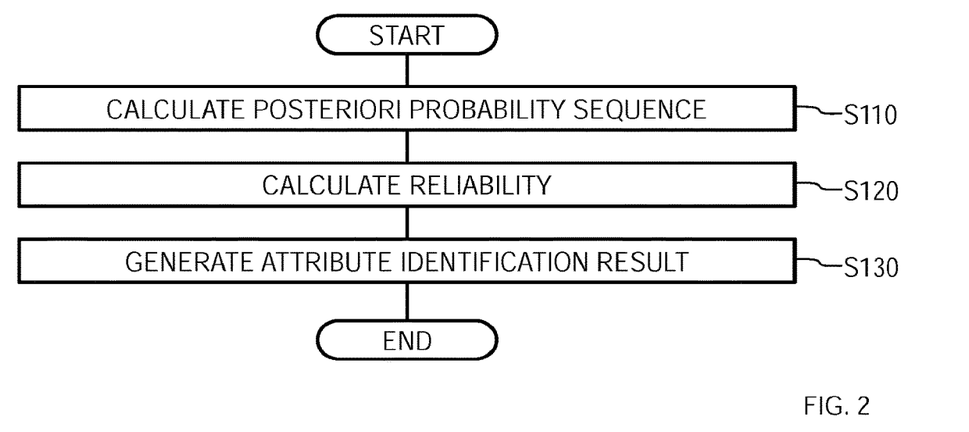
FIG. 2 is a flowchart showing an example of the operation of the attribute identification device 100.

Hereinafter, an attribute identification device 100 will be described with reference to FIGS. 1 and 2. FIG. 1 is a block diagram illustrating the configuration of the attribute identification device 100. FIG. 2 is a flowchart showing the operation of the attribute identification device 100. As illustrated in FIG. 1, the attribute identification device 100 includes a posteriori probability calculation unit 110, a reliability calculation unit 120, an attribute identification result generating unit 130, and a recording unit 190. The recording unit 190 is a component unit on which information necessary for processing which is performed by the attribute identification device 100 is appropriately recorded. For example, a threshold δ which is used by the attribute identification result generating unit 130 is recorded on the recording unit 190 in advance.

Moreover, the attribute identification device 100 reads data of an attribute identification model 930 as appropriate and executes processing. FIG. 1 is a diagram in which the attribute identification model 930 is recorded on an external recording unit; the attribute identification model 930 may be configured so as to be recorded on the recording unit 190 included in the attribute identification device 100. Hereinafter, in the present embodiment, the attribute identification model 930 recorded on an external recording unit and the attribute identification model 930 recorded on the recording unit 190 are not differentiated from one another and are expressed as the attribute identification model $\lambda_c$.

The attribute identification device 100 generates, from input speech s(t), an attribute identification result L which is the result of identification of an attribute of a speaker of the input speech s(t) and outputs the attribute identification result L.

The operation of the attribute identification device 100 will be described in accordance with FIG. 2. The posteriori probability calculation unit 110 calculates, from the input speech s(t), a posteriori probability sequence {q(c, i)} (i=0, 1, ..., I) which is a sequence of the posteriori probabilities q(c, i) that a frame i of the input speech s(t) is a class c (S110). Specifically, by using the attribute identification model $\lambda_c$, the posteriori probability calculation unit 110 obtains the posteriori probability p(c|x(i)) that a feature amount x(i) extracted from a frame i of the input speech s(t) is a class c and sets q(c, i)=p(c|x(i)). Here, 0≤q(c, i)≤1 (c=0, 1, ..., C; i=0, 1, ..., I) and $\Sigma_c$q(c, i)=1 (i=0, 1, ..., I) hold.

The reliability calculation unit 120 calculates the reliability r(c) of the class c from the posteriori probability sequence {q(c, i)} (i=0, 1, ..., I) of the class c (S120). Here, the reliability r(c) of the class c is a value indicating the extent to which the class c is a correct attribute identification result, and the reliability r(c) is defined as an index that satisfies 0≤r(c)≤1 and indicates that the closer the reliability r(c) is to 1, the more certain the attribute identification result is. For example, the reliability r(c) may be defined, as expressed in the following formula, as the average of posteriori probabilities for each class.

$$r(c) = \frac{1}{I+1}\sum_{i=0}^{I} q(c, i) \quad (1)$$

Moreover, the reliability r(c) may be defined, as expressed in the following formula, by using the product of posteriori probabilities for each class.

$$r(c) = \frac{\prod_{i=0}^{I} q(c, i)}{\sum_{c'=0}^{C} \prod_{i=0}^{I} q(c', i)} \quad (2)$$

When the reliability r(c) is defined by using Formula (2), the value of r(c) is close to 1 (for example, 0.9999) for almost every input speech, which sometimes requires fine settings of the threshold δ, based on which a determination whether or not to reject a most probable estimated class c^ is made, in the attribute identification result generating unit 130. For this reason, the reliability r(c) may be defined, as expressed in the following formula, by using a formula $x^v$, which gradually changes between 0 and 1, using an appropriate parameter v (0<v<1).

$$r(c) = \frac{\left\{\prod_{i=0}^{I} q(c, i)\right\}^v}{\sum_{c'=0}^{C} \left\{\prod_{i=0}^{I} q(c', i)\right\}^v} \quad (3)$$

The attribute identification result generating unit 130 generates an attribute identification result L of the input speech s(t) from the posteriori probability sequence {q(c, i)} (i=0, 1, ..., I) of the class c and the reliability r(c) of the class c (S130). Specifically, the attribute identification result generating unit 130 first obtains, from the posteriori probability sequence {q(c, i)} (i=0, 1, ..., I), a most probable estimated class c^ by the following formula. As is clear from the formula, the most probable estimated class is a class which is estimated to be the most probable attribute.

$$\hat{c} = \operatorname*{argmax}_{c}(\sum_{i=0}^{I} \log q(c, i)) \quad (4)$$

Next, the attribute identification result generating unit 130 compares the reliability r(c^) with the threshold δ (0<δ<1). If r(c^)≥δ (or r(c^)>δ), the attribute identification result generating unit 130 sets the most probable estimated class c^ as the attribute identification result L; if r(c^)<δ (or r(c^)≤δ), the attribute identification result generating unit 130 rejects the most probable estimated class c^ and sets φ, which indicates rejection, as the attribute identification result L.

It is to be noted that a case in which r(c^)<δ or r(c^)≤δ is referred to as a case in which the reliability r(c^) falls within a predetermined range indicating that the reliability r(c^) is low.

Figure 3A:
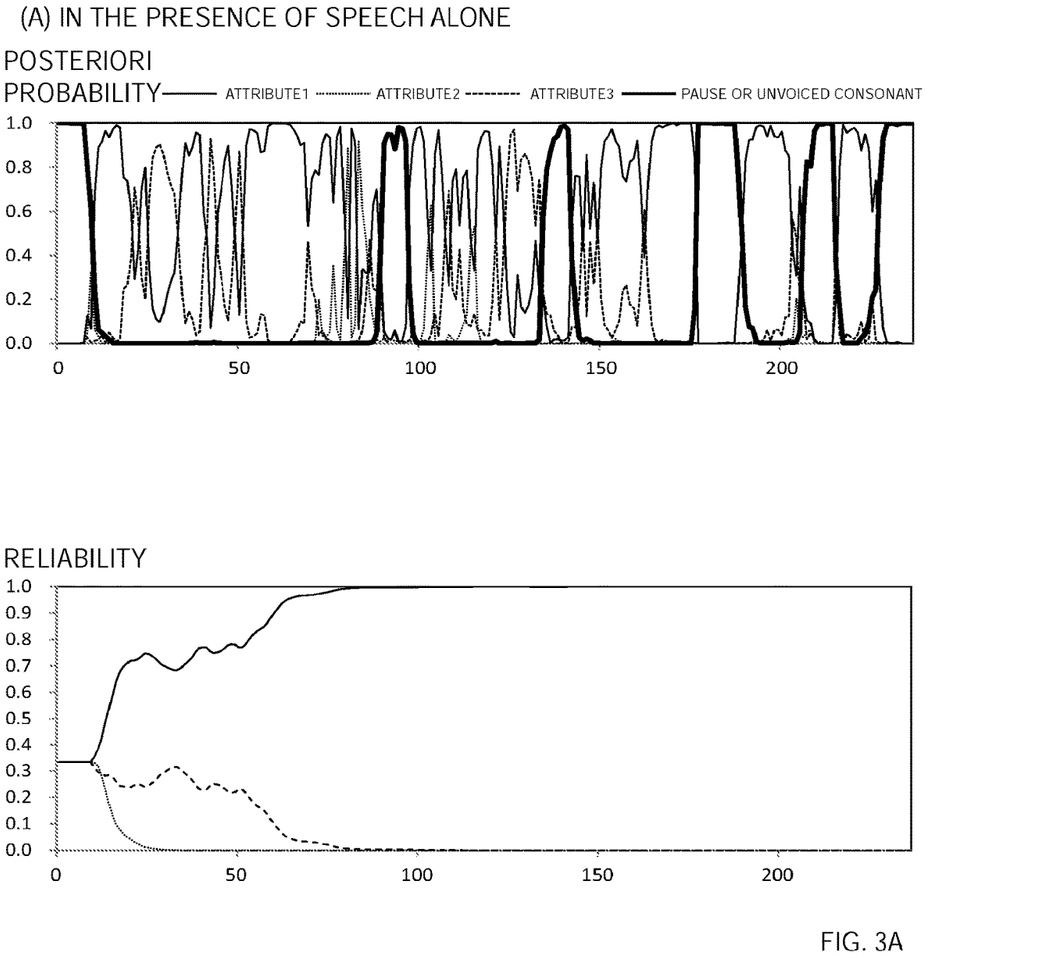
FIG. 3A is a diagram showing an example of time variations in posteriori probability and reliability.
Figure 3B:
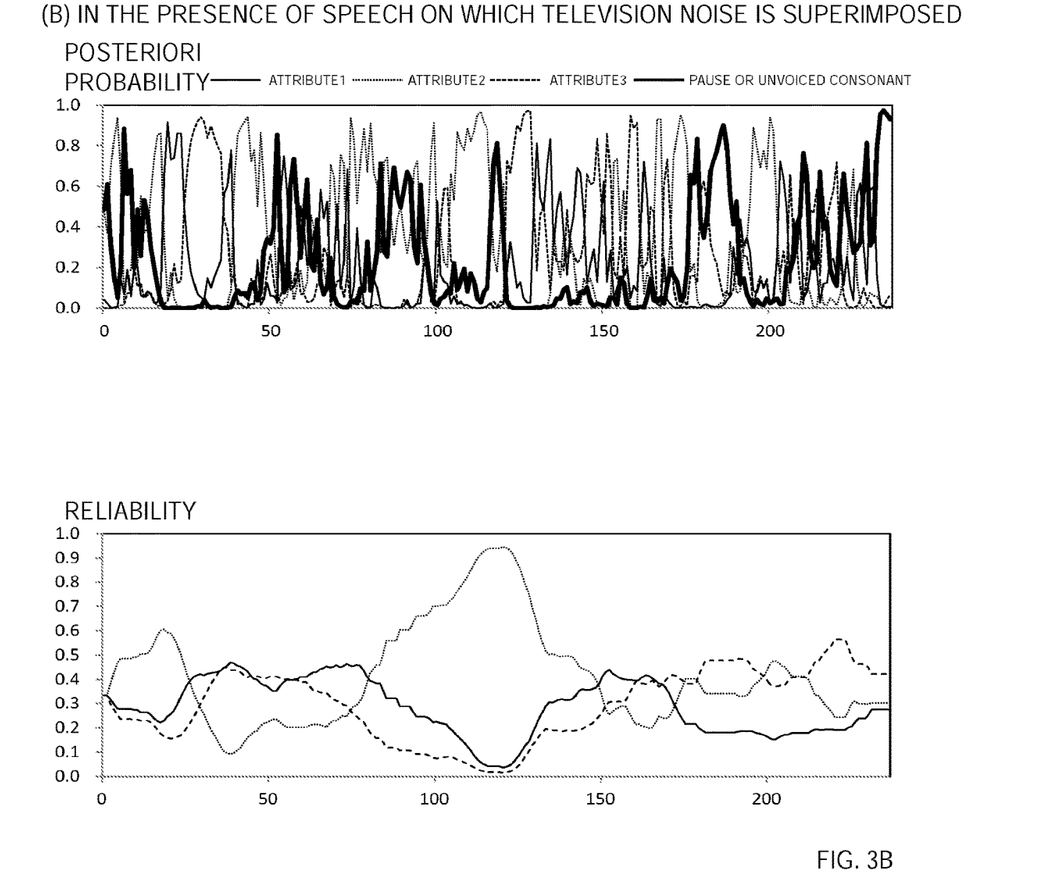
FIG. 3B is a diagram showing an example of time variations in posteriori probability and reliability.

FIGS. 3A and 3B show time variations in posteriori probability and time variations in reliability which is defined by Formula (3) on the assumption that v=1/32. FIG. 3A shows variations in posteriori probability and reliability in the presence of input speech alone, and FIG. 3B shows variations in posteriori probability and reliability in the presence of input speech on which television noise is superimposed. It is clear that, in the presence of input speech alone, a class whose reliability eventually has a value close to 1 appears when the input speech gets to a certain length, whereas, in the presence of input speech on which television noise is superimposed, each class tends to have a value lower than the corresponding value in the presence of input speech alone and no class has a value close to 1. Since reliability has such a feature, if the reliability of a most probable estimated class does not reach the predetermined threshold δ, it is possible to reject the most probable estimated class as a low-reliability class which may be erroneously identified.

(First Modification)

Figure 4:
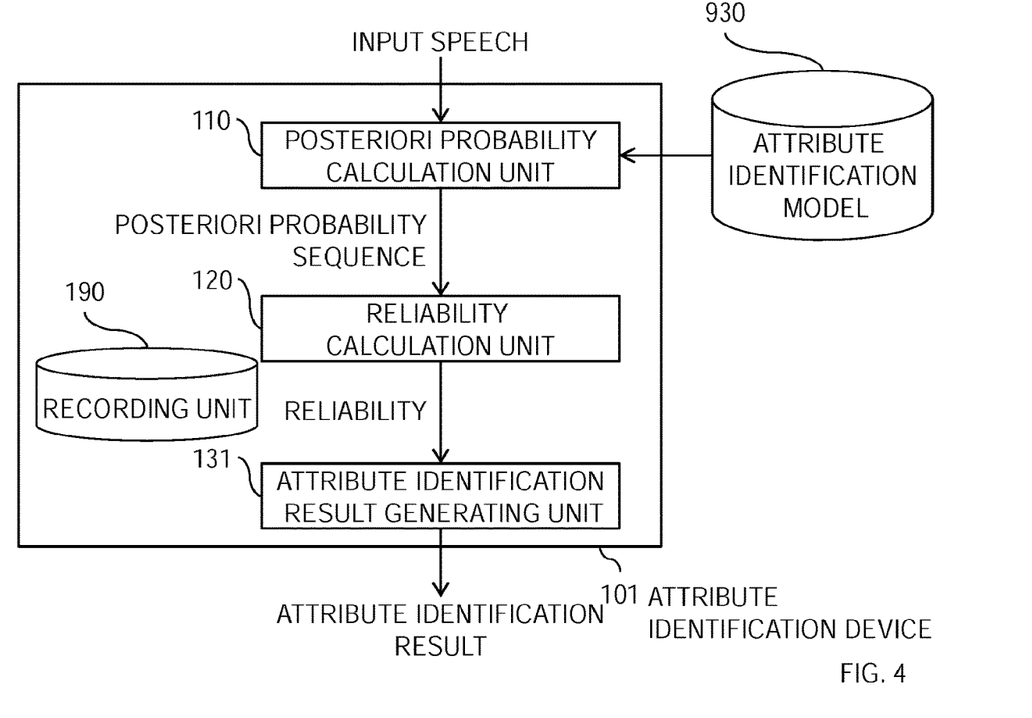
FIG. 4 is a block diagram illustrating an example of the configuration of an attribute identification device 101.
Figure 5:
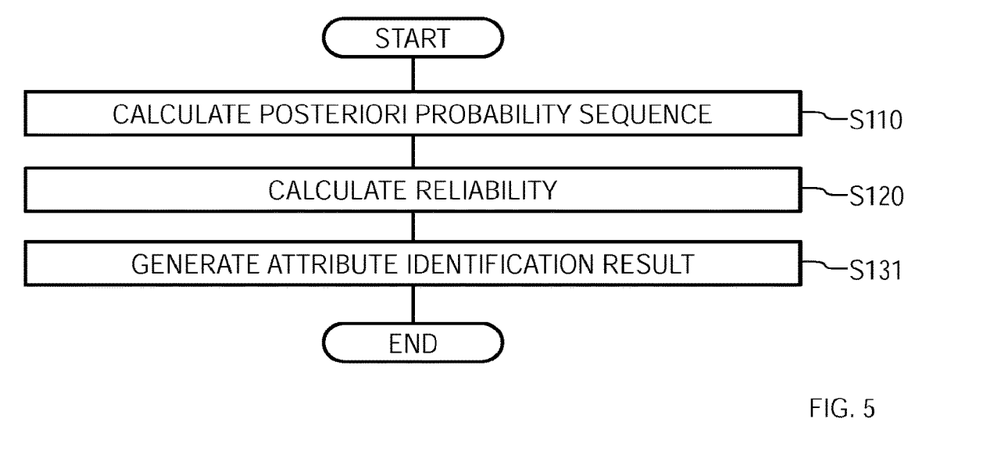
FIG. 5 is a flowchart showing an example of the operation of the attribute identification device 101.

The attribute identification device 100 is configured so as to use the posteriori probability sequence {q(c, i)} (i=0, 1, ..., I) as input to the attribute identification result generating unit 130; alternatively, the attribute identification device 100 may be configured so as to generate the attribute identification result L without using the posteriori probability sequence {q(c, i)} (i=0, 1, ..., I). Hereinafter, an attribute identification device 101 will be described with reference to FIGS. 4 and 5. FIG. 4 is a block diagram illustrating the configuration of the attribute identification device 101. FIG. 5 is a flowchart showing the operation of the attribute identification device 101. As illustrated in FIG. 4, the attribute identification device 101 includes the posteriori probability calculation unit 110, the reliability calculation unit 120, an attribute identification result generating unit 131, and the recording unit 190.

The operation of the attribute identification device 101 will be described in accordance with FIG. 5. The posteriori probability calculation unit 110 calculates, from input speech s(t), a posteriori probability sequence {q(c, i)} (i=0, 1, ..., I) which is a sequence of the posteriori probabilities q(c, i) that a frame i of the input speech s(t) is a class c (S110). The reliability calculation unit 120 calculates the reliability r(c) of the class c from the posteriori probability sequence {q(c, i)} (i=0, 1, ..., I) of the class c (S120).

The attribute identification result generating unit 131 generates an attribute identification result L of the input speech s(t) from the reliability r(c) of the class c (S131). Specifically, the attribute identification result generating unit 131 first obtains a most probable estimated class ĉ from the reliability r(c) of the class c by the following formula.

$$\hat{c} = \underset{c}{\mathrm{argmax}}(r(c)) \quad (5)$$

Next, the attribute identification result generating unit 131 compares the reliability r(ĉ) with the threshold δ (0<δ<1). If r(ĉ)≥δ (or r(ĉ)>δ), the attribute identification result generating unit 131 sets the most probable estimated class ĉ as the attribute identification result L; if r(ĉ)<δ (or r(ĉ)≤δ), the attribute identification result generating unit 131 rejects the most probable estimated class ĉ and sets φ, which indicates rejection, as the attribute identification result L.

(Second Modification)

Figure 6:
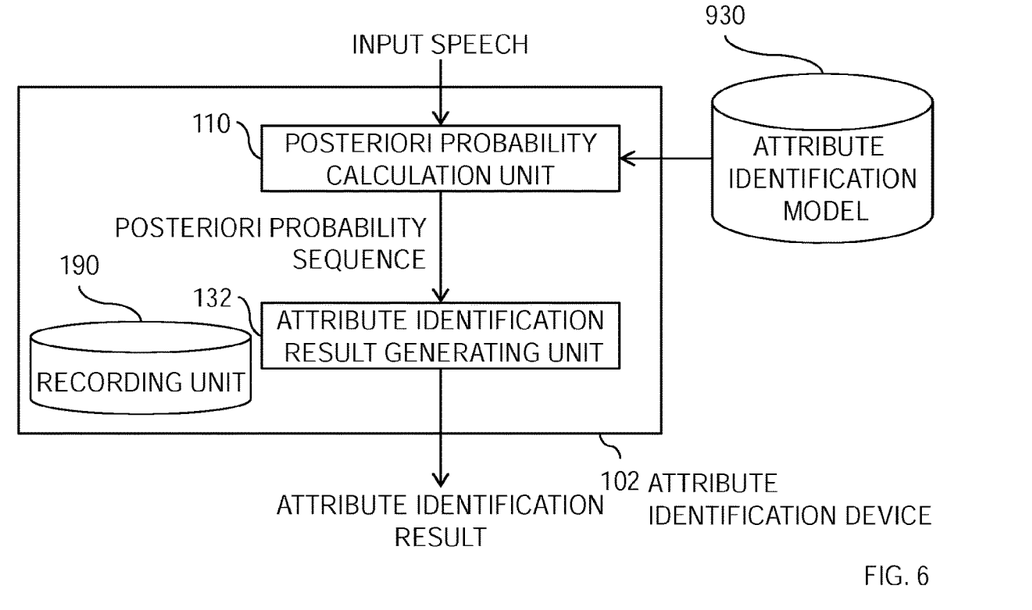
FIG. 6 is a block diagram illustrating an example of the configuration of an attribute identification device 102.
Figure 7:
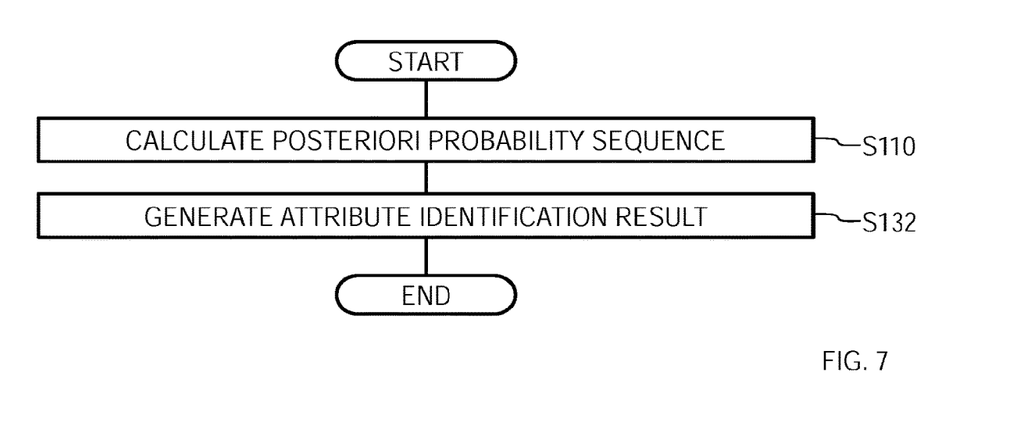
FIG. 7 is a flowchart showing an example of the operation of the attribute identification device 102.

Moreover, the attribute identification device 100 is configured so as to use the reliability r(c) as input to the attribute identification result generating unit 130; alternatively, the attribute identification device 100 may be configured so as to use only the posteriori probability sequence {q(c, i)} (i=0, 1, ..., I) as input. In this case, calculation of reliability is performed only on a most probable estimated class. Hereinafter, an attribute identification device 102 will be described with reference to FIGS. 6 and 7. FIG. 6 is a block diagram illustrating the configuration of the attribute identification device 102. FIG. 7 is a flowchart showing the operation of the attribute identification device 102. As illustrated in FIG. 6, the attribute identification device 102 includes the posteriori probability calculation unit 110, an attribute identification result generating unit 132, and the recording unit 190.

The operation of the attribute identification device 102 will be described in accordance with FIG. 7. The posteriori probability calculation unit 110 calculates, from input speech s(t), a posteriori probability sequence {q(c, i)} (i=0, 1, ..., I) which is a sequence of the posteriori probabilities q(c, i) that a frame i of the input speech s(t) is a class c (S110).

The attribute identification result generating unit 132 generates an attribute identification result L of the input speech s(t) from the posteriori probability sequence {q(c, i)} (i=0, 1, ..., I) of the class c (S132). Specifically, the attribute identification result generating unit 132 first obtains a most probable estimated class ĉ from the posteriori probability sequence {q(c, i)} (i=0, 1, ..., I) by Formula (4). Next, the attribute identification result generating unit 132 calculates the reliability r(ĉ) of the most probable estimated class ĉ. For this calculation, Formulae (1) to (3) can be used; for example, the attribute identification result generating unit 132 only has to be configured so as to include the reliability calculation unit 120. Finally, the attribute identification result generating unit 132 compares the reliability r(ĉ) with the threshold δ (0<δ<1). If r(ĉ)≥δ (or r(ĉ)>δ), the attribute identification result generating unit 132 sets the most probable estimated class ĉ as the attribute identification result L; if r(ĉ)<δ (or r(ĉ)≤δ), the attribute identification result generating unit 132 rejects the most probable estimated class ĉ and sets φ, which indicates rejection, as the attribute identification result L.

According to the present invention, by rejecting an attribute identification result if the reliability thereof, which indicates the certainty of the attribute identification result, is low, it is possible to prevent impairment of usability and prevent displeasure caused by presenting an unreliable identification result to the user.

Second Embodiment

In the first embodiment, reliability is calculated by using formulae such as Formulae (1) to (3). In a second embodiment, reliability is calculated by using a reliability calculation model instead of using formulae. That is, an attribute identification device of the second embodiment differs from each attribute identification device of the first embodiment only in that the reliability r(c) of a class e is calculated from a posteriori probability sequence {q(c, i)} (i=0, 1, ..., I) of the class c by using the reliability calculation model. This reliability calculation model is learned by a reliability calculation model learning device 200. The reliability calculation model is recorded on a recording unit of the attribute identification device before the attribute identification device starts processing.

Figure 8:
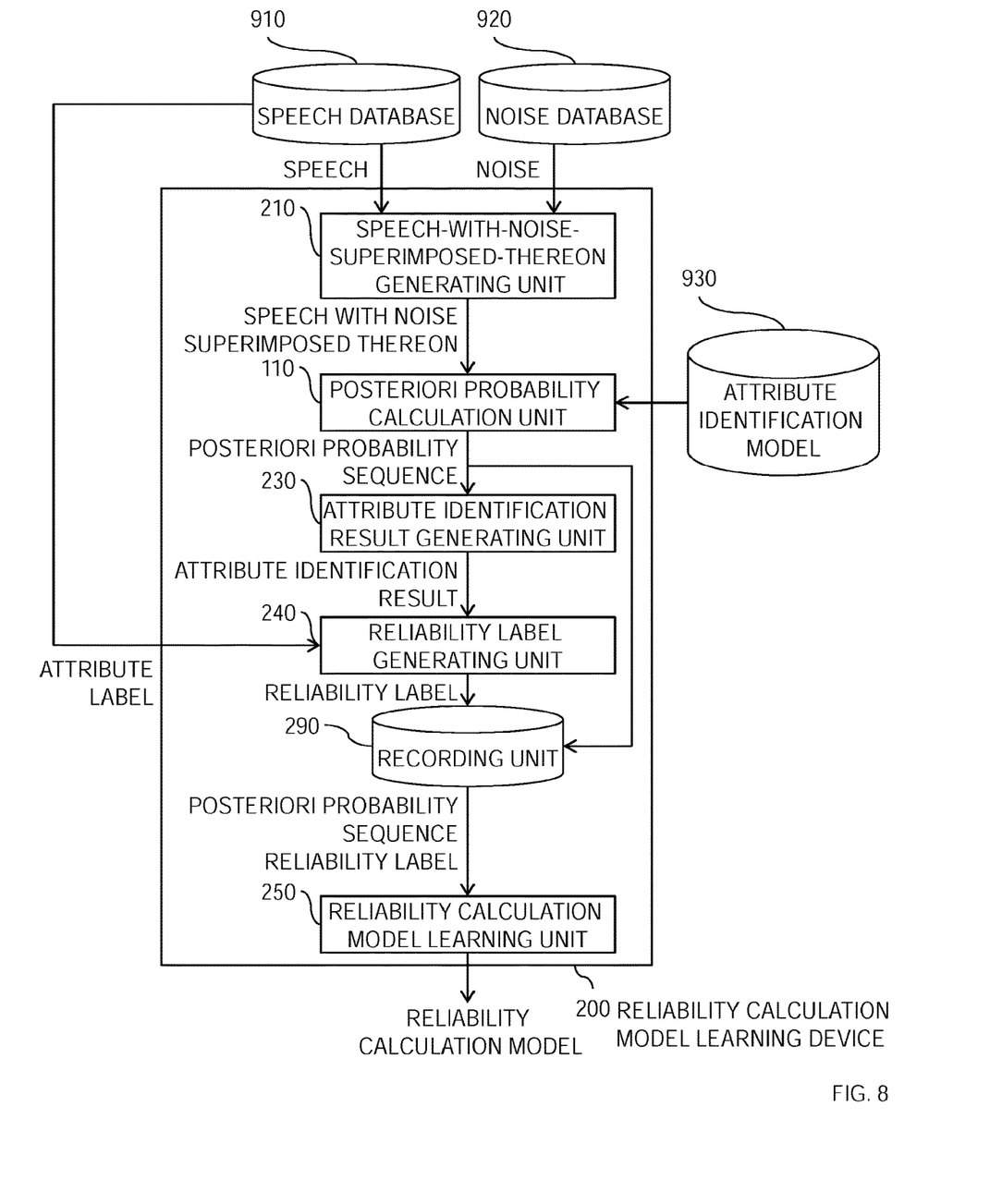
FIG. 8 is a block diagram illustrating an example of the configuration of a reliability calculation model learning device 200.
Figure 9:
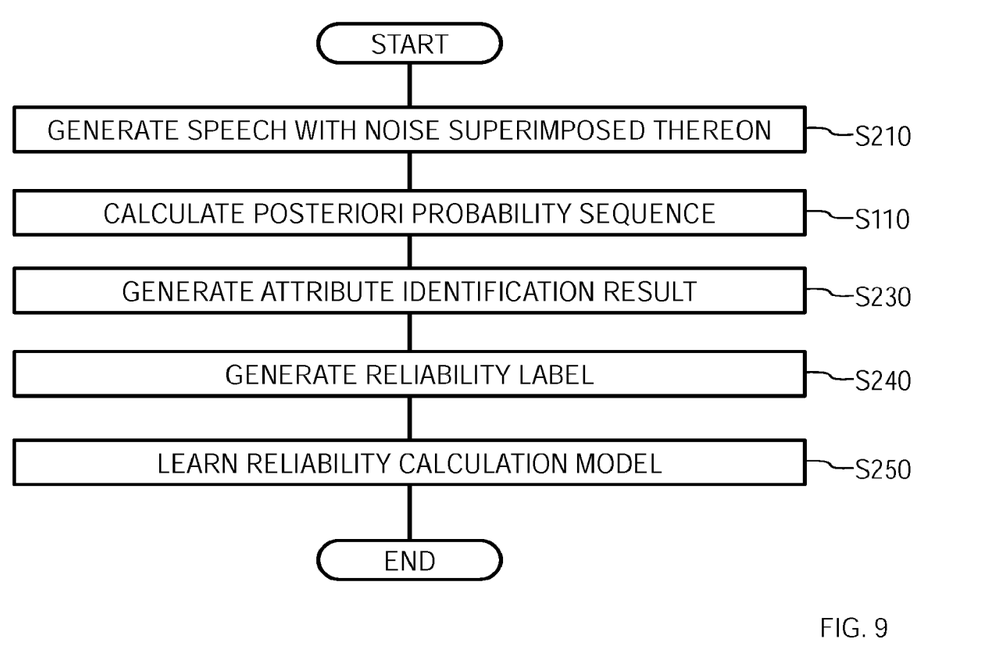
FIG. 9 is a flowchart showing an example of the operation of the reliability calculation model learning device 200.

Hereinafter, the reliability calculation model learning device 200 will be described with reference to FIGS. 8 and 9. FIG. 8 is a block diagram illustrating the configuration of the reliability calculation model learning device 200. FIG. 9 is a flowchart showing the operation of the reliability calculation model learning device 200. As illustrated in FIG. 8, the reliability calculation model learning device 200 includes a speech-with-noise-superimposed-thereon generating unit 210, a posteriori probability calculation unit 110, an attribute identification result generating unit 230, a reliability label generating unit 240, a reliability calculation model learning unit 250, and a recording unit 290. The recording unit 290 is a component unit on which information necessary for processing which is performed by the reliability calculation model learning device 200 is appropriately recorded. For example, a database on a posteriori probability sequence with a reliability label, which is used by the reliability calculation model learning unit 250 for learning, is recorded on the recording unit 290.

Moreover, the reliability calculation model learning device 200 reads data of each of a speech database 910, a noise database 920, and an attribute identification model 930 as appropriate and executes processing. FIG. 8 is a diagram in which each of the speech database 910, the noise database 920, and the attribute identification model 930 is recorded on an external recording unit; each of the speech database 910, the noise database 920, and the attribute identification model 930 may be configured so as to be recorded on the recording unit 290 included in the reliability calculation model learning device 200.

The speech database 910 is a database made up of speech with an attribute label, which is a tuple of M+1 speech $s_m(t)$ (m=0, 1, ..., M, where M is an integer greater than or equal to 0) and an attribute label $A_m$ of the speech $s_m(t)$. The attribute label $A_m$ of the speech $s_m(t)$ is an attribute value (a class) of a speaker of the speech $s_m(t)$ and is a label indicating a right attribute identification result. Moreover, the noise database 920 is a database made up of J+1 noise $n_j(t)$ (j=0, 1, ..., J, where J is an integer greater than or equal to 0). Each noise $n_j(t)$ contained in the noise database 920 includes, for example, speech and music such as actual radio broadcast and television broadcast. The attribute identification model 930 is the attribute identification model $\lambda_c$ used in the first embodiment.

By using the speech database 910, the noise database 920, and the attribute identification model 930, the reliability calculation model learning device 200 learns the reliability calculation model that outputs the reliability of a class c by using a posteriori probability sequence of the class c as input.

The operation of the reliability calculation model learning device 200 will be described in accordance with FIG. 9. The speech-with-noise-superimposed-thereon generating unit 210 generates speech with noise superimposed thereon $x_m(t)$ from speech $s_m(t)$ (m=0, 1, . . . , M) of the speech database 910 and noise $n_j(t)$ (j=0, 1, . . . , J) of the noise database 920 (S210). Specifically, the speech-with-noise-superimposed-thereon generating unit 210 generates random values j, α, and a for each speech $s_m(t)$ and generates speech with noise superimposed thereon $x_m(t)$ by the following formula.

$$x_m(t)=s_m(t)+\alpha n_j(t+a) \qquad (6)$$

Here, j is an index for selecting noise which is superimposed on speech and 0≤j≤J holds. Moreover, a is an SN ratio and, when the power of speech and the power of noise are nearly equal, α can be an SN ratio of −20 to 30 dB, that is, $\alpha=10^{-20/10}$ to $10^{30/10}$. a is a value for selection of a segment of noise used and only has to be randomly selected so as not to be longer than the time length of the noise $n_j(t)$.

The posteriori probability calculation unit 110 calculates, from the speech with noise superimposed thereon $x_m(t)$, a posteriori probability sequence $\{q_m(c, i)\}$ (i=0, 1, . . . , $I_m$, where $I_m$ is an integer greater than or equal to 0) which is a sequence of the posteriori probabilities $q_m(c, i)$ that a frame i of the speech with noise superimposed thereon $x_m(t)$ is a class c (S110).

The attribute identification result generating unit 230 generates an attribute identification result $L_m$ of the speech $s_m(t)$ from the posteriori probability sequence $\{q_m(c, i)\}$ (i=0, 1, . . . , $I_m$) of the class c (S230). Specifically, the attribute identification result generating unit 230 obtains a most probable estimated class $\hat{c}_m$ by the following formula and sets the most probable estimated class $\hat{c}_m$ as the attribute identification result $L_m$.

$$\hat{c}_m = \operatorname*{argmax}_c \left( \sum_{i=0}^{I_m} \log q_m(c, i) \right) \qquad (7)$$

The reliability label generating unit 240 generates a reliability label $r_m$, which is used for learning of the reliability calculation model, from the attribute identification result $L_m$ by using the attribute label $A_m$ of the speech $s_m(t)$ (S240). For instance, $r_m=1$ holds if $L_m=A_m$ (that is, the attribute identification result is a right attribute identification result); $r_m=0$ holds otherwise (that is, the attribute identification result is not a right attribute identification result).

$$r_m = \begin{cases} 1 & (L_m = A_m) \\ 0 & (L_m \neq A_m) \end{cases} \qquad (8)$$

The reliability label generating unit 240 records a posteriori probability sequence with a reliability label, which is a tuple of a posteriori probability sequence $\{q_m(\hat{c}_m, i)\}$ (i=0, 1, . . . , $I_m$) of the most probable estimated class $\hat{c}_m$ and the reliability label $r_m$, on the recording unit 290 and creates a database on a posteriori probability sequence with a reliability label.

By using the database on a posteriori probability sequence with a reliability label, the reliability calculation model learning unit 250 learns a reliability calculation model $\lambda_r$ that outputs the reliability of a class c by using a posteriori probability sequence of the class c as input (S250). Since the reliability calculation model $\lambda_r$ handles time series data, it can be configured as, for example, a neural network such as long short-term memory (LSTM) or a recurrent neural network (RNN).

Figure 10A:
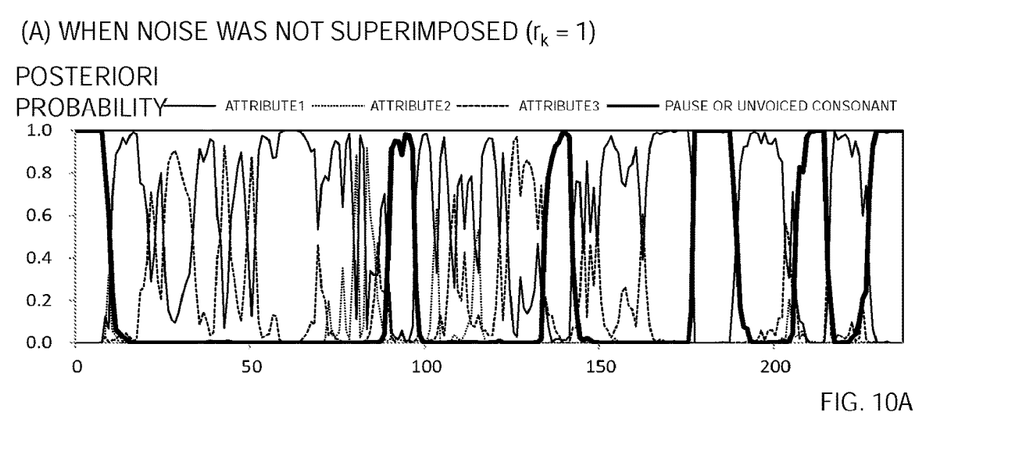
FIG. 10A is a diagram showing an example of time variations in posteriori probability.
Figure 10B:
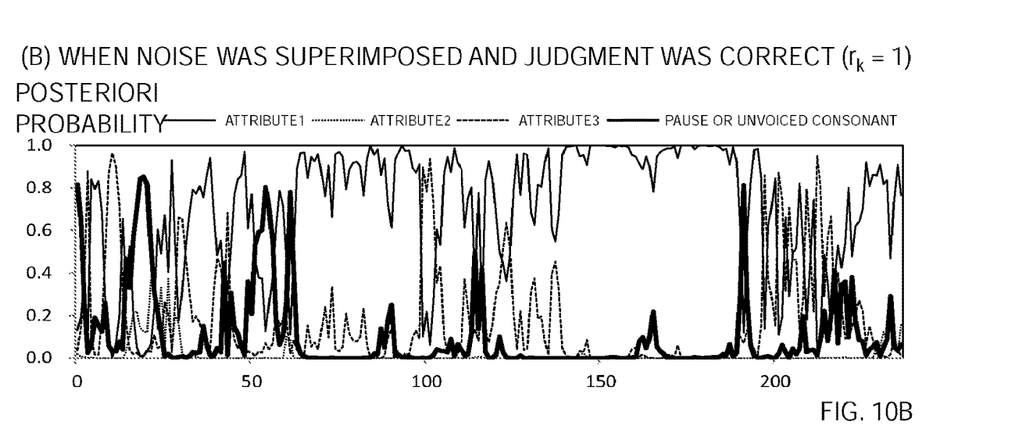
FIG. 10B is a diagram showing an example of time variations in posteriori probability.
Figure 10C:
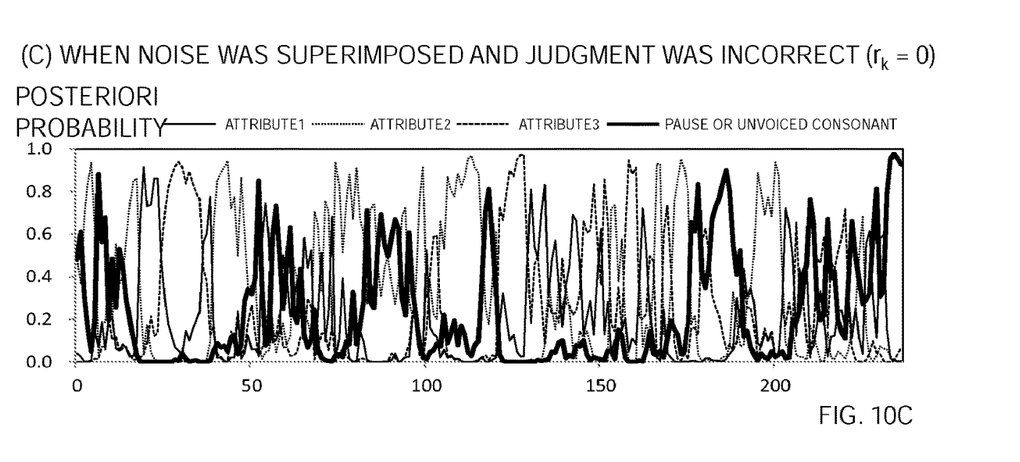
FIG. 10C is a diagram showing an example of time variations in posteriori probability.

FIGS. 10A, 10B, and 10C show time variations in posteriori probability. FIG. 10A shows variations in posteriori probability observed when noise was not superimposed and a correct identification result was obtained, FIG. 10B shows variations in posteriori probability observed when a correct identification result was obtained for speech with noise superimposed thereon, and FIG. 10C shows variations in posteriori probability observed when a correct identification result was not obtained for speech with noise superimposed thereon. There are two differences, which will be described below, between FIG. 10B and FIG. 10C.

When a correct identification result was obtained as in FIG. 10B, a particular class tended to exhibit a high posteriori probability, whereas, when a correct identification result was not obtained as in FIG. 10C, a plurality of classes alternately exhibited a high posteriori probability with the passage of time. Moreover, when a correct identification result was obtained as in FIG. 10B, the posteriori probability remained at a value close to 1 after a lapse of some time, whereas, when a correct identification result was not obtained as in FIG. 10C, the posteriori probability did not exhibit a relatively high value even after a lapse of time and, even if the posteriori probability exhibited a high value, the duration was relatively short.

As described above, since a pattern of time variations in posteriori probability when a correct identification result was obtained is different from a pattern of time variations in posteriori probability when a correct identification result was not obtained, the reliability calculation model $\lambda_r$ can be learned as a model that handles time series data, which makes it possible to calculate reliability.

According to the present invention, by rejecting an attribute identification result when the reliability thereof, which indicates the certainty of the attribute identification result, is low, it is possible to prevent impairment of usability and prevent displeasure caused by presenting an unreliable identification result to the user.

APPENDIX

Each device according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the device executing the processing or any necessity.

As already mentioned, when the processing functions of the hardware entities described in the embodiments (the devices of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An attribute identification method in an attribute identification device, wherein
a set of classes for identifying a speaker of uttered speech is to be an attribute,
the attribute identification method comprises:
calculating, from input speech, a posteriori probability sequence which is a sequence of posteriori probabilities that each frame of the input speech is a class c,
calculating, from the posteriori probability sequence, a value $r(c)$ of the class c, the value $r(c)$ indicating an extent to which the class c is a correct attribute identification result,
obtaining, from the value $r(c)$, a most probable estimated class $\hat{c}$ which is a class that is estimated to be a most probable attribute, and
deciding, based on the value $r(\hat{c})$ of the most probable estimated class $\hat{c}$, whether the most probable estimated class $\hat{c}$ is an attribute identification result or the most probable estimated class $\hat{c}$ is to be rejected.

2. An attribute identification method in an attribute identification device, wherein
a set of classes for identifying a speaker of uttered speech is to be an attribute,
the attribute identification method comprises:
calculating, from input speech, a posteriori probability sequence which is a sequence of posteriori probabilities that each frame of the input speech is a class c,
obtaining, from the posteriori probability sequence, a most probable estimated class $\hat{c}$ which is a class that is estimated to be a most probable attribute,
calculating, from the posteriori probability sequence, a value $r(\hat{c})$ of the most probable estimated class $\hat{c}$, the value $r(\hat{c})$ indicating an extent to which the class $\hat{c}$ is a correct attribute identification result, and deciding, based on the value $r(\hat{c})$ of the most probable estimated class $\hat{c}$, whether the most probable estimated class $\hat{c}$ is an attribute identification result or the most probable estimated class $\hat{c}$ is to be rejected.

3. A non-transitory computer-readable storage medium which stores a program for making a computer execute the attribute identification method according to claim 1.

4. A non-transitory computer-readable storage medium which stores a program for making a computer execute the attribute identification method according to claim 2.

* * * * *